United States Patent [19]

Leander

[11] Patent Number: 5,115,903
[45] Date of Patent: May 26, 1992

[54] METHOD AND APPARATUS FOR ORIENTATION OF FISH UPON A CONVEYOR

[75] Inventor: Leif Leander, Askim, Sweden

[73] Assignee: VMK Fish Machinery AB, Sweden

[21] Appl. No.: 616,373

[22] Filed: Nov. 21, 1990

[30] Foreign Application Priority Data

Nov. 29, 1989 [SE] Sweden .................. 8904033

[51] Int. Cl.⁵ .............................. B65G 47/24
[52] U.S. Cl. .................. 198/400; 452/179
[58] Field of Search .......... 198/399, 400, 395; 452/179

[56] References Cited

U.S. PATENT DOCUMENTS

| 3,315,299 | 4/1967  | Danielsson     | 452/179 X |
| 3,550,192 | 12/1970 | Ericksson      | 452/179   |
| 3,943,603 | 3/1976  | Hartmann       | 452/179   |
| 4,051,952 | 10/1977 | Hauptmann et al. | 198/415 X |
| 4,557,020 | 12/1985 | Wenzel         | 452/179   |
| 4,630,334 | 12/1986 | Evers et al.   | 452/179   |
| 4,651,385 | 3/1987  | Persson        | 452/179   |

FOREIGN PATENT DOCUMENTS

| 1271932 | 7/1968  | Fed. Rep. of Germany | 452/179 |
| 0039539 | 2/1988  | Japan                | 452/179 |
| 86944   | 12/1955 | Norway .             |         |
| 109534  | 7/1966  | Norway .             |         |

Primary Examiner—Robert P. Olszewski
Assistant Examiner—Cheryl L. Gasstineau
Attorney, Agent, or Firm—Lerner, David, Littenberg, Krumholz & Mentlik

[57] ABSTRACT

A method and apparatus for orienting fish upon a conveyor wherein fish are transported lying in single file past a detection device for determining the orientation of the back, belly or sides of the fish. Fish deviating from a desired orientation are then turned to the desired orientation.

11 Claims, 2 Drawing Sheets

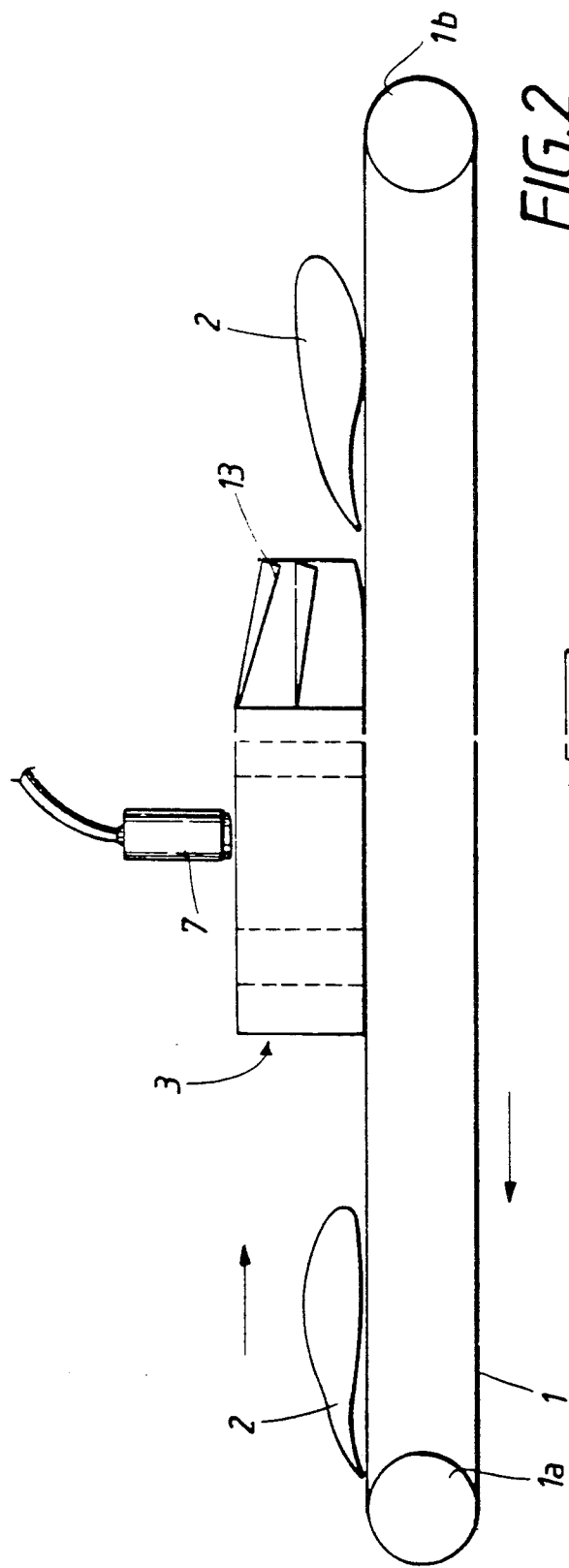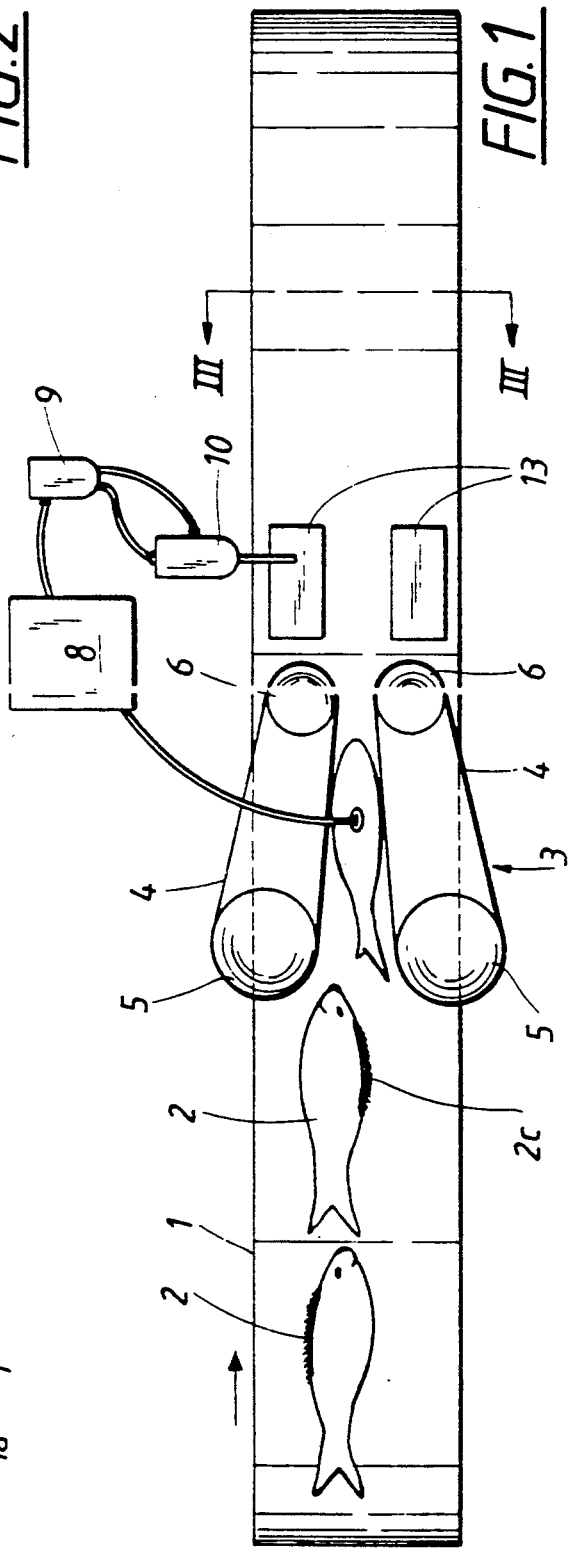

METHOD AND APPARATUS FOR ORIENTATION OF FISH UPON A CONVEYOR

BACKGROUND OF THE INVENTION

The present invention relates to a method and an apparatus for orientation of fish upon a conveyor, by means of which the fish is transported lying in single file on random side, principally in parallel with the longitudinal direction of the conveyor.

In plants for processing fish there usually is a need for orientation of the fish in relation to the direction of conveyance, so that the fish is turned with its back- and belly side respectively in the same direction. Usually this orientation is accomplished by uprighting the fish from a position where it lies on either side, to a position where the fish stands vertically with the back side up. After this orientation, each fish can, if so desired, again be put down on the same side.

Prior art apparatuses for orientation of the in a file conveyed fish usually comprise a pair of rollers which are compliantly journalled upon vertical shafts, at a mutual distance principally corresponding to the width of the fish. Since many species of fish are more narrow at the belly side, a certain torque is generated on the fish about its longitudinal axis as it reaches into the nip of the pair of rollers.

However, this prior art method does not work for some species of white-fish, e.g. codfish, haddock and alaskan pollok, which have a more regular body shape with the same thickness at the back and belly side. These kinds of fish will be randomly uprighted with the back or belly side up.

SUMMARY OF THE INVENTION

One of the objects of the invention is to provide a method and an apparatus, which in a simple and efficient way are capable of orienting fish having a regular body shape, in relation to a conveyor.

For this purpose, the method according to the invention is characterized in that the line of fish is transported past means for detecting of whether the back or the belly side of the fish is turned toward the detecting means which are located adjacent the conveyor, and that fish deviating from a desired orientation is turned by turning means to the desired orientation.

According to one preferable embodiment of the invention, each fish in a line is randomly uprighted from its lying position to a position with the back or belly side up, that a detection is made as to which one of said sides is turned up, and that the fish is brought to rotate around its longitudinal axis in one or the other direction, depending upon said detection, so that every fish is placed either upon its left or its right side upon the conveyor.

According to a variation of the method according to the invention, the fish is uprighted to a first inclined position, from which it will be tipped over to a contrary inclined position, if a deviation from the normal value is detected.

According to another variation of the method, the fish is uprighted to a vertical position, and thereafter it is tipped over to one or the other direction, depending upon said detection.

The apparatus according to the invention is characterized in that the conveyor extends past means for uprighting one fish at a time so that the back- or belly side is turned upward, means for detection if a fish in the uprighting means is turned toward the detecting means located above the conveyor, and means for turning one fish at a time around its longitudinal axis located behind the uprighting means in the working direction of the conveyor, the turning means being activated by the detection means.

According to one preferable embodiment of the invention, the turning means comprises at least one plate which is pivotally journalled on a central axle and controllable by means of a fluid cylinder.

Preferably, the turning means comprise two in parallel pivotally arranged plates enabling the tipping over of the fish to one side or the other.

The detection means are preferably optical.

BRIEF DESCRIPTION OF THE DRAWINGS

The above mentioned and other properties of the invention will be described in more detail with reference to the accompanying drawings, in which FIG. 1 shows a fish conveyor with an apparatus according to the invention, in view from above, FIG. 2 is a corresponding side view.

In FIGS. 1-2, the reference number 1 designates a conveyor comprising an endless belt which runs over two rollers 1a, 1b, and which is arranged for transport of fish from one in the art well known apparatus for directing fish with the head in the same direction, to means for beheading and removal of intestines.

Figure 3:
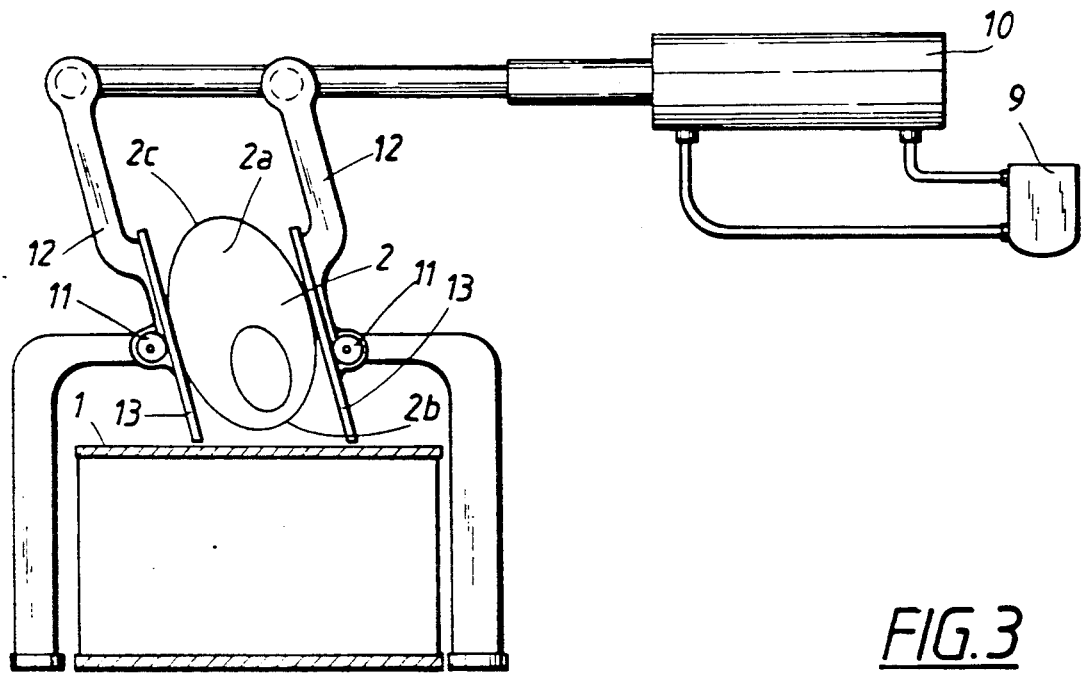
FIG. 3 shows in greater detail a section along line III—III in FIG. 2, with the apparatus in a first end position, and FIG. 4 correspondingly as FIG. 3 shows the apparatus in a second position of use.

The fish 2 lies randomly on the left or right side in a line on the conveyor 1 and are carried toward means 3 for uprighting one fish at a time with the back or belly side up.

The means for uprighting 3 comprises two band systems 4, working in parallel and each being driven by a first roller 5 and a second roller 6 with comparatively smaller diameter.

A detection means 7 is arranged at the means 3 for uprighting and is adapted to detect if the back or belly side 2a and 2b respectively of the fish is turned up from the belt. The detection means 7 can work optically, so that they recognize if the light belly side 2b or the dark back side 2a is turned up. Alternatively, the detection means may operate mechanically for detection of the presence of a back fin 2c.

Figure 4:
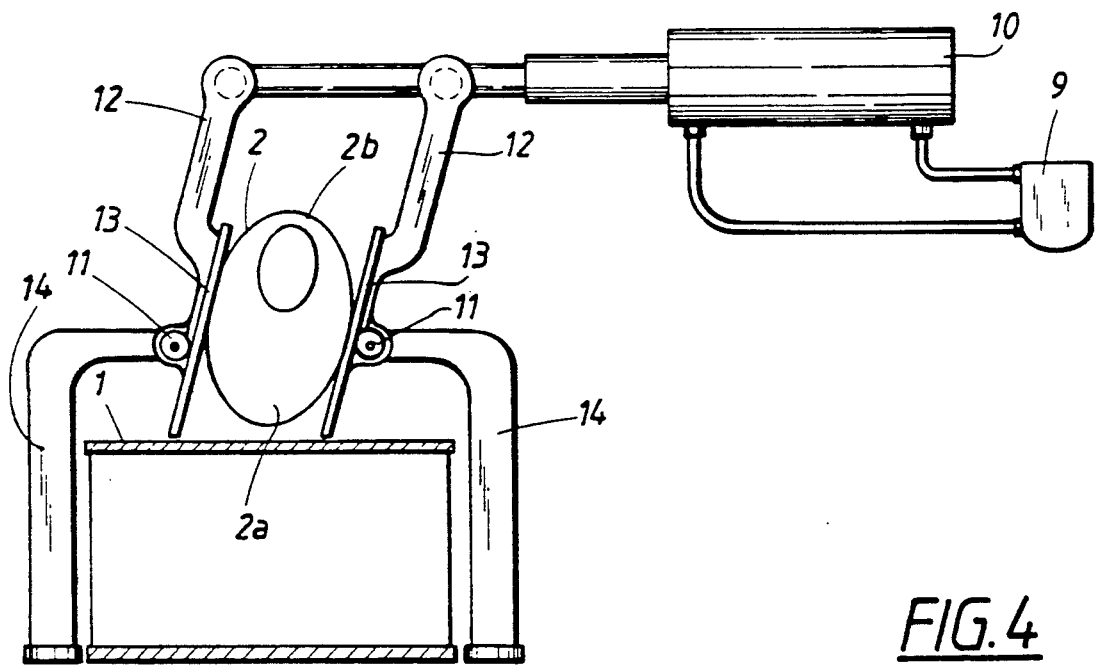

The detection means 7 are electrically connected to a control central 8, which is adapted to govern a power source 9, which supplies drive power to a switch over means 10. As seen in FIG. 3 and FIG. 4, the switch over means 10 is mechanically connected via two horizontal pivot shafts 11, and levers 12 to two in parallel rotatable plates 13. The pivot shafts 11 are mounted in vertical supports 14 at each side of the conveyor 1.

While a fish is fed from the means 3 for uprighting in between the rotatable plates 13 these are held vertical by the switch over means 10. Depending upon the state of detection registered by the detection means 7, the switch over means 10 is then switched over to the end position shown in FIG. 3 or 4. This will tip the fish 2 over, so that its point of balance is moved to the side of its contact surface to the conveyor 1. When the fish 2 thereafter is moved from the plates 13, it will tip down upon the desired side, i.e. all fish will lie oriented upon the same side of the conveyor 1.

The invention is not limited to the above described embodiment, but several variations are possible within the scope of the accompanying claims. For example, the detection can be made with the fish lying on its side upon the conveyor, then the fish which deviates in orientation is turned over. Also, the means 3 for uprighting can be so designed that the fish is uprighted to an inclined position. In this embodiment, the switch over means 8 can maneuver a single rotation plate 13, to tip the fish over to an oppositely inclined position, if a deviation from a normal value is detected. The switch over means 10 can be pneumatically, hydraulically or electrically driven.

What is claimed is:

1. A method of orienting fish upon a conveyor, said fish having a back portion, a belly portion, and a pair of sides, said method comprising the steps of:
   conveying said fish in single file along said conveyor,
   selecting a desired orientation in which a predetermined one of either said back portion or said belly portion of said fish is facing in a predetermined direction,
   uprighting each of said fish and detecting whether said back portion of said belly portion of said fish is facing upwardly, and,
   turning any of said fish in which said predetermined one of said back portion or said belly portion of said fish is not facing upwardly whereby said single file of the fish is transported by said conveyor with each of said fish in said desired orientation.

2. A method according to claim 1, wherein said step of detection comprises optically detecting said desired orientation of said fish.

3. A method according to claim 1, further comprising the steps of:
   uprighting said fish whereby either said back portion or said belly portion of each of said fish is facing upwardly from said conveyor before said step of detecting,
   said step of detecting comprising detecting whether said back portion or said belly portion of each of said fish is oriented in a predetermined direction, and
   said step of turning further comprising rotating said fish about its longitudinal axis in a clockwise or counterclockwise direction, whereby said line of fish is transported by said conveyor with each of said fish in said desired orientation.

4. A method according to claim 3, wherein
said step of uprighting each fish further comprises uprighting said fish to a first inclined position whereby said back portion of said belly portion is disposed on said conveyor, and said back portion or said belly portion not disposed upon said conveyor is at a speed distance from said conveyor,
said turning step further comprising rotating said fish about said longitudinal axis to a second inclined position whereby same said back portion or said belly portion is disposed on conveyor and said back portion or said belly portion not disposed on said conveyor is at a spaced distance from said conveyor, if said predetermined direction deviates from said desired orientation.

5. A method according to claim 3, wherein said step of uprighting each of said fish comprises uprighting each of said fish to a vertical position, wherein one of said back portion or said belly portion is disposed upon said conveyor and said other of said back portion or said belly portion is at a maximum spaced distance from said conveyor.

6. An apparatus for orientating fish upon a conveyor, said fish having a back portion, a belly portion, and a pair of sides, said apparatus comprising:
   conveyor means for conveying said fish in single file along said conveyor means,
   uprighting means for uprighting said fish,
   detection means for detecting whether each of said uprighted fish is oriented in a desired orientation in which a predetermined one of either said back portion or said belly portion of said fish is facing said detection means, and
   turning means for turning any of said fish in which said predetermined one of said back portion or said belly portion of said fish is not facing said detection means, whereby said single fish of fish is transported by said conveyor with each of said fish with said back portion or said belly portion facing in the same direction.

7. The apparatus according to claim 6 including uprighting means for uprighting said fish whereby either said back portion or said belly portion of each of said fish is facing upwardly from said conveyor before said detection means, and wherein said detection means include means for detecting either said back portion or said belly portion of said fish is oriented in a predetermined direction, and wherein said turning means include, rotating means for rotating said fish about its longitudinal axis in a clockwise or counter-clockwise direction, whereby said line of fish is transported by said conveyor with each of said fish in said desired orientation.

8. An apparatus according to claim 6, wherein said detection means comprises a means for optically detecting said desired orientation of said fish.

9. An apparatus according to claim 7, wherein said turning means comprises at least one plate, said plate pivotally journaled on a central axis and controlled by at least one fluid cylinder.

10. An apparatus according to claim 6 or 9, wherein said turning means comprises two parallel plates, each said plate pivotally journaled on a corresponding axle.

11. An apparatus according to claim 10, wherein said detection means comprises a means for optically detecting the said desired orientation of said fish.

* * * * *

UNITED STATES PATENT AND TRADEMARK OFFICE
CERTIFICATE OF CORRECTION

PATENT NO.  :   5,115,903
DATED       :   May 26, 1992
INVENTOR(S) :   Leif Leander It is certified that error appears in the above-identified patent and that said Letters Patent is hereby corrected as shown below:

Column 2, line 32, delete "from one in the art" and insert therefor --from, for example, a--.
Column 3, line 34, delete "detection" and insert therefor --detecting--.
Column 3, line 54, delete "of" and insert therefor --or--.
Column 3, line 57, delete "speed" and insert therefor --spaced--.
Column 4, line 28, delete "fish" and insert therefor --file--.

Signed and Sealed this

Thirteenth Day of July, 1993

Attest:

MICHAEL K. KIRK

*Attesting Officer*    Acting Commissioner of Patents and Trademarks